United States Patent
Schumann et al.

(10) Patent No.: US 9,641,700 B2
(45) Date of Patent: May 2, 2017

(54) METHOD FOR AUTOMATICALLY SELECTING TEST PARAMETERS OF AN IMAGE INSPECTION SYSTEM AND IMAGE INSPECTION SYSTEM FOR IMPLEMENTING THE METHOD

(71) Applicant: HEIDELBERGER DRUCKMASCHINEN AG, Heidelberg (DE)

(72) Inventors: Frank Schumann, Heidelberg (DE); Winfried Berg, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 16 days.

(21) Appl. No.: 14/674,142

(22) Filed: Mar. 31, 2015

(65) Prior Publication Data

US 2015/0281470 A1    Oct. 1, 2015

(30) Foreign Application Priority Data

Mar. 31, 2014  (DE) .......................... 10 2014 004 557

(51) Int. Cl.
*H04N 1/00* (2006.01)
*G06T 7/00* (2006.01)

(52) U.S. Cl.
CPC ......... *H04N 1/00068* (2013.01); *G06T 7/001* (2013.01); *G06T 7/0008* (2013.01);
(Continued)

(58) Field of Classification Search
CPC ......... G06T 7/0008; G06T 2207/30144; G06T 2207/20081; G06T 2207/20004;
(Continued)

(56) References Cited

U.S. PATENT DOCUMENTS 5,999,636 A  * 12/1999  Juang ..................... B41F 33/02
                                                250/559.05
7,464,645 B2    12/2008  Jeschonneck et al.
(Continued)

FOREIGN PATENT DOCUMENTS

DE   102004021047 B3   10/2005
DE   102010054344 A1    6/2012
EP        1579994 A1    9/2005

OTHER PUBLICATIONS

Jähne, Bernd: "Digitate Bildverarbeitung", Berlin, Heildeberg, New York: Springer-Verlag 2002, pp. 541-544—ISBN 3-540-41260-3—Statement of Relevance.

*Primary Examiner* — Kim Vu
*Assistant Examiner* — Pinalben Patel
(74) *Attorney, Agent, or Firm* — Laurence A. Greenberg; Werner H. Stemer; Ralph E. Locher

(57) ABSTRACT

A method for automatically selecting test parameters for an image inspection system using a computer, includes digitizing a reference image or a scanned printed image to determine target values, categorizing the image elements that are present, determining tolerances for the target values based on the categorization, calculating the inspection sensitivity based on target values and the respective tolerances thereof, setting the parameters of the image inspection system based on the inspection sensitivity, and configuring the image inspection using these parameters. An image inspection system for implementing the method is also provided.

8 Claims, 3 Drawing Sheets

(52) U.S. Cl.
CPC ....... *G06T 7/0022* (2013.01); *H04N 1/00015* (2013.01); *H04N 1/00039* (2013.01); *H04N 1/00087* (2013.01); *G06T 2207/10008* (2013.01); *G06T 2207/20004* (2013.01); *G06T 2207/20081* (2013.01); *G06T 2207/30144* (2013.01)

(58) Field of Classification Search
CPC ........ G06T 2207/10008; G06T 7/0022; H04N 1/00068; H04N 1/00039; H04N 1/00015; H04N 1/00087
See application file for complete search history.

(56) References Cited

U.S. PATENT DOCUMENTS

| | | | |
|---|---|---|---|
| 7,570,797 B1 * | 8/2009 | Wang | G01N 21/9501 250/559.45 |
| 7,672,022 B1 * | 3/2010 | Fan | G06T 7/0083 348/207.99 |
| 7,872,776 B2 * | 1/2011 | Mongeon | H04N 1/6033 358/1.9 |
| 8,564,799 B2 * | 10/2013 | Grodsky | G03G 15/5062 340/5.2 |
| 8,736,864 B2 | 5/2014 | Giess | |
| 2005/0004774 A1 * | 1/2005 | Volk | G01N 21/9501 702/108 |
| 2006/0115127 A1 * | 6/2006 | Hatayama | B41J 29/393 382/112 |
| 2015/0356717 A1 * | 12/2015 | Madden | G06T 7/001 358/1.6 |

\* cited by examiner

METHOD FOR AUTOMATICALLY SELECTING TEST PARAMETERS OF AN IMAGE INSPECTION SYSTEM AND IMAGE INSPECTION SYSTEM FOR IMPLEMENTING THE METHOD

CROSS-REFERENCE TO RELATED APPLICATION

This application claims the priority, under 35 U.S.C. §119, of German Patent Application DE 10 2014 004 557.9, filed Mar. 31, 2014; the prior application is herewith incorporated by reference in its entirety.

BACKGROUND OF THE INVENTION

Field of the Invention

The present invention relates to a method of automatically selecting test parameters of an image inspection system. The invention also relates to an image inspection system for implementing the method.

The technical field of the invention is the automation of testing processes.

The image inspection process to be parameterized has been used so far to inspect finished printed products for potential defects in the course of the processing of a print job. The process includes the steps of scanning the printed images using a digital camera, forwarding the data to a server, and comparing the data of the printed image to reference image data created in a prepress department. Deviations between the re-digitized printed image and the reference image are detected as defects as a function of the parameterization of the comparative algorithms and are displayed.

Various prior art options are available to carry out the parameterization. The most common option is that an operator sets the parameters manually. That process relies on an operator's analysis of the reference image created from the prepress data of the print job and on the operator's configuration of the image inspection process based on the result of the analysis and on the personal experience of the operator. Known enhancements of that process include the abstraction of the parameter settings to different sensitivity levels. An advantage of that process is that even inexperienced operators may carry out the parameterization of the inspection process because the operator no longer has direct access to the individual parameters. A disadvantage of that process, however, is the lack of flexibility compared to a completely free manual setting. A common disadvantage of all known manual methods is their dependence on a human operator whose analysis and resultant settings of the image inspection method may be inadequate. The less experienced the operator and the more complex the choice of parameter settings, the greater the risk of errors. Moreover, for reasons of constraints in terms of time and costs, the parameter settings will in general not be adapted for every new print job.

SUMMARY OF THE INVENTION

It is accordingly an object of the invention to provide a method for automatically selecting test parameters of an image inspection system and an image inspection system for implementing the method, which overcome the hereinaforementioned disadvantages of the heretofore-known methods and systems of this general type and in which test parameters are selected and quantified in an automated way based on predefined criteria.

With the foregoing and other objects in view there is provided, in accordance with the invention, a method of automatically selecting test parameters of an image inspection system using a computer, comprising the steps of:
1. digitizing the reference image or a scanned printed image to determine the target values,
2. categorizing the image elements that are present,
3. defining tolerances for the target values based on the categorization,
4. calculating the inspection sensitivity based on the target values and their respective tolerances,
5. setting the parameters of the image inspection system based on the inspection sensitivity, and
6. configuring the image inspection process using these parameters.

The core element of the disclosed method is the categorization of the reference image obtained from digital prepress data to define target values and tolerances. The categorization is necessary because different image elements such as images, text, bar codes, etc. require different test parameters. The paper white plays a part, too. The data pairs formed of target and tolerance values that have been obtained in this way allow a calculation of the inspection sensitivity that is to be selected to inspect the printed images to be inspected in the image inspection process. The parameters for the automatic configuration of the image inspection process are in turn derived from the inspection sensitivity. An advantage of the disclosed method is that the parameterization process is carried out automatically for every new print job, i.e. time-consuming parameterization by an experienced operator is no longer necessary.

In accordance with a preferred further development, the determined target and tolerance values are corrected afterwards based on specific properties of the print job such as printed side, thickness and type of printing material. These properties of the print job may be automatically obtained from the print job, for instance in the JDF format, or they may be manually input by the operator.

In accordance with another preferred development, the tolerances are corrected as a function of the respective side that the image to be inspected is printed on, since there is a difference between whether the printed image to be inspected is on the front/recto side or on the back/verso side. The former needs to be inspected more carefully than the latter. Thus tolerances for the front/recto side need to be stricter than tolerances for the back/verso side.

In accordance with an added preferred development of the method of the invention, target values and tolerances are corrected as a function of the thickness of the printing material on which the image to be inspected is to be printed, since in the case of thin paper, there may be transparency effects that may falsify the results of the inspection. Consequently, target values and tolerances need to be adapted as a function of the thickness of the paper.

In accordance with an additional preferred development of the method of the invention, target values and tolerances are corrected as a function of the properties of the printing material onto which the image to be inspected is to be printed. For some types of paper, an adaptation of target values and tolerances is necessary. For instance, for recycled paper, the detection threshold needs to be lowered. Color and quality of the printing material play a part, too. The properties of the printing material may be input by hand or may be determined automatically on the printing material by a camera or scanner.

In accordance with yet a further preferred development of the method of the invention, the operator may be capable of switching the automatic parameterization on and off. When the automatic parameterization is switched off, a manual input of the parameters is possible. Although automatic parameterization in accordance with the disclosed method is the preferred mode of operation, the operator is still to be given the option of entering parameters manually or correcting parameters that have been determined in the automated process.

In accordance with yet an added preferred development of the method of the invention, the operator may manually correct the parameters that have been determined automatically. Such corrections may be necessary if specific test criteria have not been correctly detected or categorized in the automated process or if environmental parameters change while the printing press is in operation.

In accordance with yet an additional preferred development of the method of the invention, the parameters that have been determined automatically are saved in a memory that is accessible from the computer. The memory does not necessarily have to be an internal memory of the computer. An external network memory is conceivable. Saving the determined parameters simplifies manual correction and the analysis of errors if the parameterization process did not work properly.

In accordance with the invention, a provision may be made for the parameters of the image inspection system to be set as a function of the properties of the image content of the reference image or of the scanned printed image. Different print shop customers have different expectations. For instance, a print shop printing patient information leaflets will need to make sure that any minute deviation such as a missing dot in a dosage is correctly and reliably recognized. Such errors need to be detected and the products in question need to be disposed of. A printed picture does not have such high standards. In printed pictures, small errors and defects may be acceptable and need not be disposed of. In white areas (non-printed areas), mere paper defects may be accepted and need not be displayed as defects. Thus different applications require different evaluations. Consequently, it makes sense to evaluate the different areas in a printed image largely automatically by scanning the areas and assigning them to a category for which useful parameters have been predefined. Thus the parameters are set as a function of the image content of the printed image, which may vary from area to area as a function of the category to which an image area belongs.

With the objects of the invention in view, there is concomitantly provided an image inspection system for testing printed images of a printing press, in which the system is set up to implement the method according to the invention for the automated selection of test parameters.

Other features which are considered as characteristic for the invention are set forth in the appended claims.

Although the invention is illustrated and described herein as embodied in a method for automatically selecting test parameters of an image inspection system and an image inspection system for implementing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
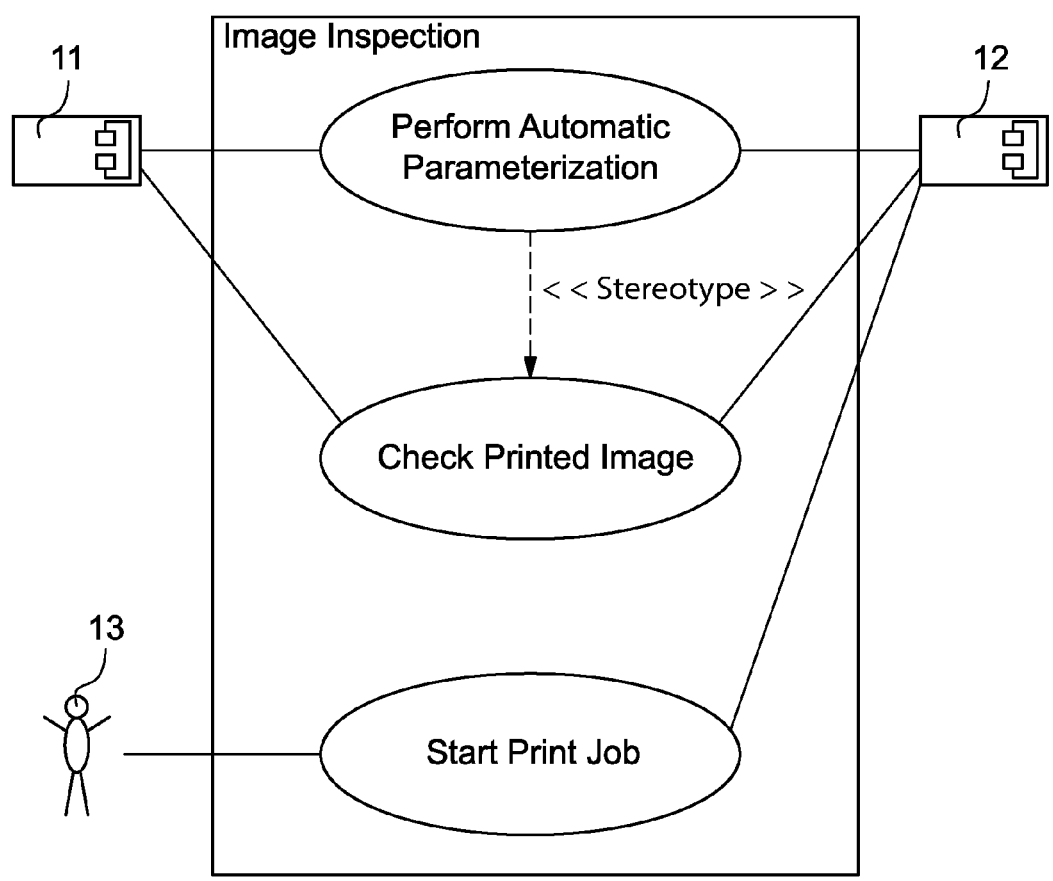
FIG. 1 is a diagram illustrating an application of the method of the invention.
Figure 2:
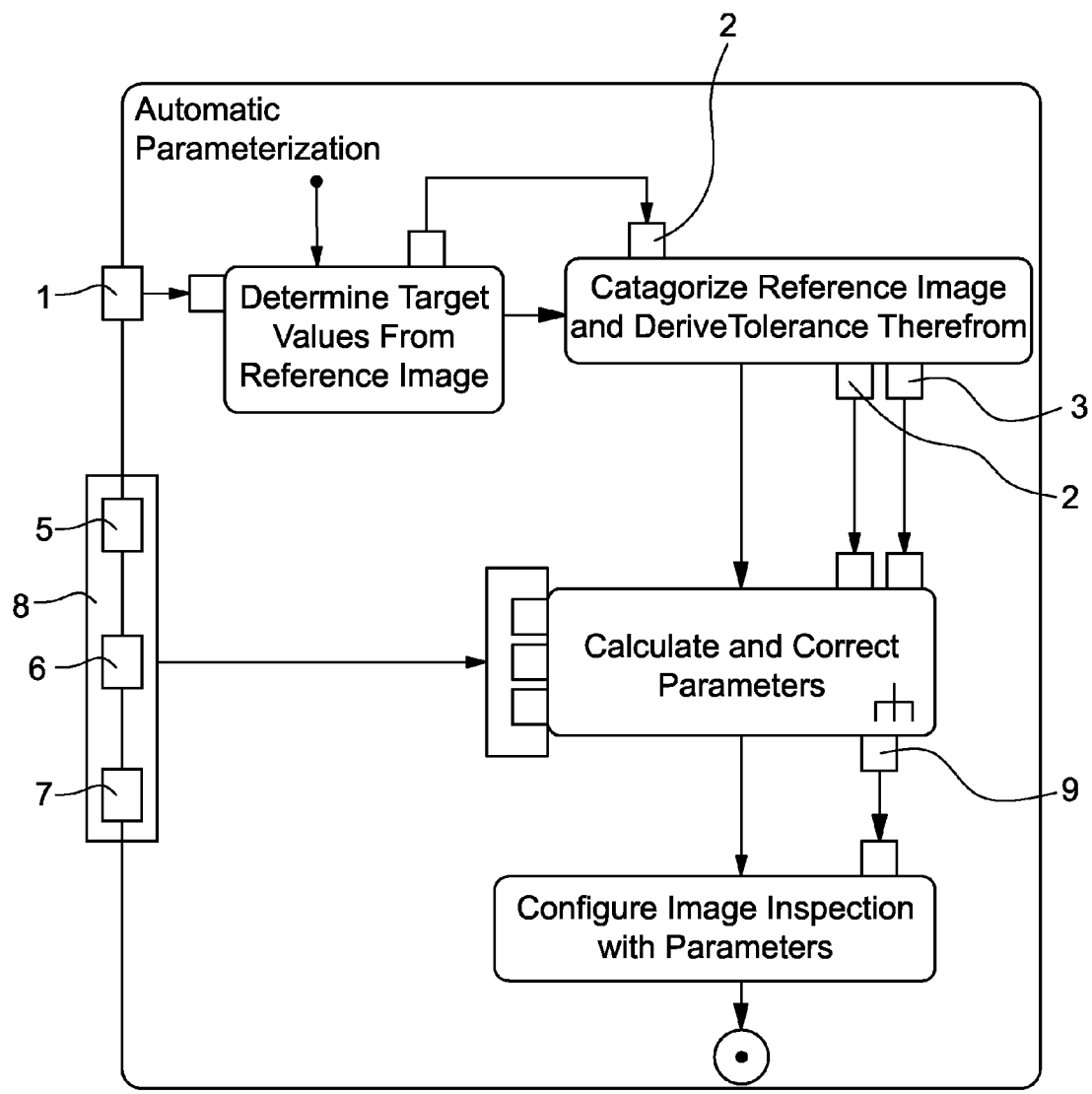
FIG. 2 is a flow chart illustrating the method.

Referring now to the figures of the drawings in detail and first, particularly, to FIG. 1 thereof, there is seen a preferred exemplary embodiment, in which an operator 13 may start a parameterization of an image inspection process as a print job is carried out. Image inspection using a camera 11 for digitizing a printed image is carried out by a program that runs on a computer, as shown in FIG. 1, and preferably has a graphical user interface that may be operated by the operator 13 using a screen 12 connected to the computer. The operator 13 may use the screen 12 and corresponding input/output devices to select manual parameterization, automatic parameterization, or correction of the parameters of an ongoing process. The sequence of the automatic parameterization process is shown in FIG. 2. When the operator 13 selects automated parameterization, target values 2 for the image inspection process are obtained from a reference printed image 1 since the basic measuring principle of the image inspection process relies on a comparison between the target values 2 of the reference image 1, including certain tolerances 3, and the measured actual values of the images to be inspected. The determined target values 2 are subsequently categorized on the basis of image elements present in the reference image 1. The different categories of image elements indicate what the image represents, for instance text, images, bar code, 2D matrix code, etc. Different categories have different image inspection requirements. For instance, a defect in a bar code is much more serious than a defect in a picture of a landscape. Different uses and purposes need to be considered, too. There are stricter image inspection requirements for a patient information leaflet for a pharmaceutical product, than for the text of a poster. Based on the various requirements derived from the different image element categories and the different uses and purposes, different tolerances 3 are defined for the determined target values 2.

However, there are further parameters that influence the levels of target values 2 and tolerances 3. These parameters are mainly paper properties 8 of the paper on which the images to be inspected are to be printed. These properties 8 are known from the prepress data that are also used to generate the reference image 1. The determined target values 2 and tolerances 3 thus factor in the influence of the paper properties 8 to obtain a correct inspection result in the image inspection process. One of the properties 8 is the printed side 5 on which the inspection is made, since it makes a difference whether the front/recto side or the back/verso side is inspected, because the former needs to be inspected more carefully than the latter. Thus the tolerances or thresholds 3 for the recto side are stricter than for the verso side. A further property 8 is the thickness 6 of the paper. Thin papers exhibit transparency effects that may falsify the inspection results. Consequently, target values and tolerances are adapted as a function of the thickness 6 of the paper. In addition, the type 7 of the paper plays a part. For some paper types 7, target values 2 and tolerances 3 need to be adapted because these paper types 7 have an influence on the print results and thus on the inspection results. For instance, the detection threshold needs to be lowered for recycled paper. Each correction produces corrected tolerances 4 providing corrected target values 10.

Figure 3:
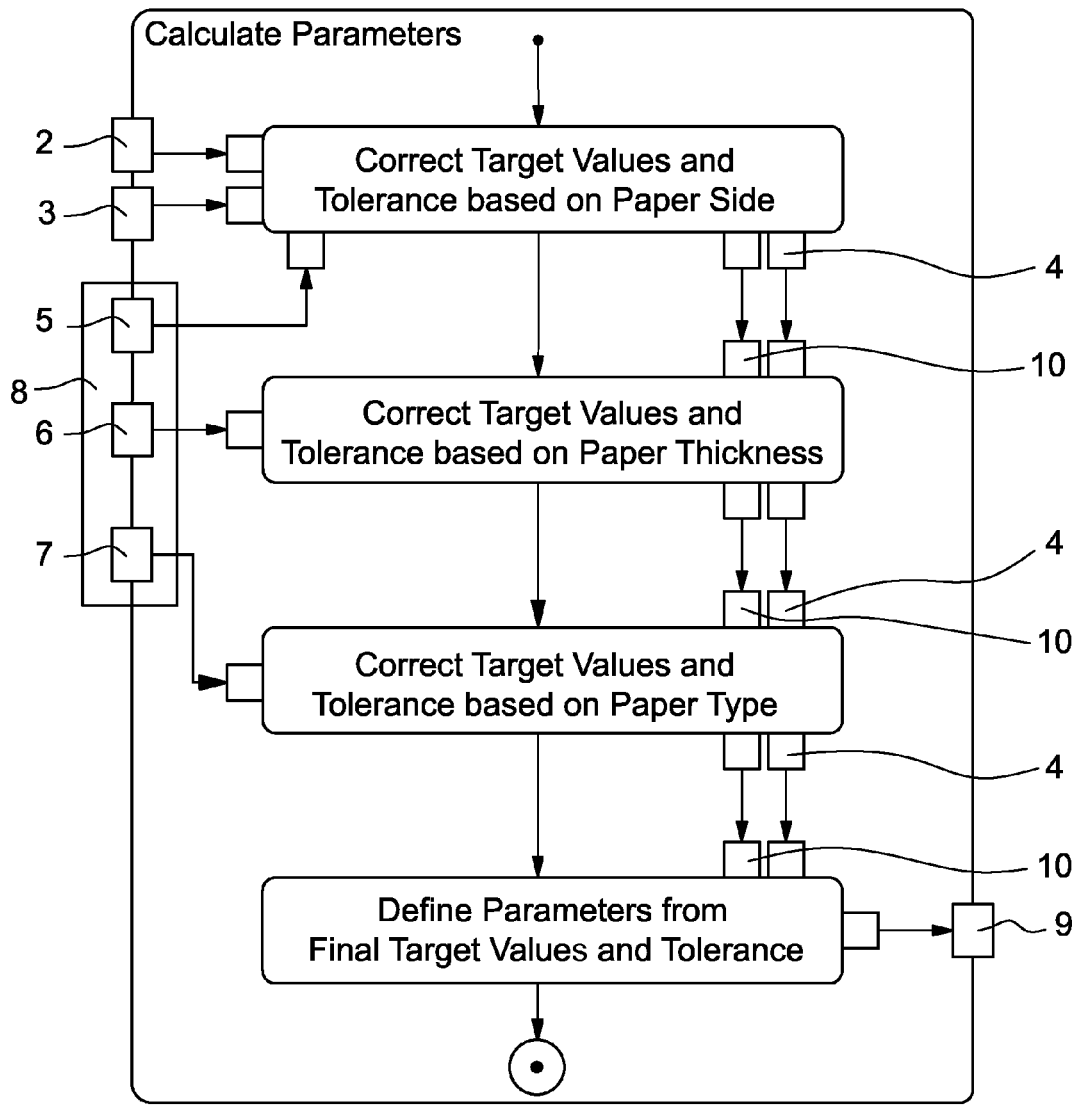
FIG. 3 is a flow chart illustrating an automatic calculation and correction of parameters.

Factoring in the aforementioned properties 8 allows the resultant deviations of target values 2 and tolerances 3 to be determined. Subsequent to the calculation thereof from the various categories of image elements, the required adaptations are made. The sequence of the method is described in FIG. 3. The determined target values 2, the tolerances 3 thereof, and the resultant inspection sensitivity are then applied to parameterize the image inspection. In addition, it makes sense to buffer or save the determined parameters 9 to be able to access these values if necessary or to be able to correct them if the parameterization went wrong.

The invention claimed is:

1. A method for automatically selecting test parameters for an image inspection system using a computer, the method comprising the following steps:
   digitizing a reference image or a scanned printed image to determine target values taken from image values of the reference image;
   categorizing image elements being present in the digitized reference image or the scanned printed image;
   determining tolerances for the target values based on the categorization;
   correcting the determined target values and tolerances as a function of additional properties including a respective printed side or a print job of the image to be inspected;
   calculating inspection sensitivity based on the target values and the respective tolerances thereof;
   setting the parameters of the image inspection system based on the inspection sensitivity; and
   configuring the image inspection by using the parameters.

2. The method according to claim 1, which further comprises correcting the target values and tolerances as a function of a thickness of a printing material onto which the image to be inspected is to be printed.

3. The method according to claim 1, which further comprises correcting the target values and tolerances as a function of properties of the printing material onto which the image to be inspected is to be printed.

4. The method according to claim 1, which further comprises switching the automated parameterization on and off by an operator, allowing a manual input of the parameters.

5. The method according to claim 4, which further comprises correcting the automatically determined parameters by hand by the operator.

6. The method according to claim 1, which further comprises saving the automatically determined parameters in a memory medium accessible by the computer.

7. The method according to claim 1, which further comprises setting the parameters of the image inspection system as a function of properties of an image content of the reference image or of the scanned printed image.

8. An image inspection system for testing printed images of a printing press, the system comprising:
   a computer performing an automated selection of test parameters by:
      digitizing a reference image or a scanned printed image to determine target values taken from image values of the reference image;
      categorizing image elements being present in the digitized reference image or the scanned printed image;
      determining tolerances for the target values based on the categorization;
      correcting the determined target values and tolerances as a function of additional properties including a respective printed side or a print job of the image to be inspected;
      calculating inspection sensitivity based on the target values and the respective tolerances thereof;
      setting the parameters of the image inspection system based on the inspection sensitivity; and
      configuring the image inspection by using the parameters.

* * * * *